United States Patent [19]

Suzuki

[11] Patent Number: 4,849,957
[45] Date of Patent: Jul. 18, 1989

[54] DIGITAL SIGNAL REPRODUCING CIRCUIT
[75] Inventor: Hiroshi Suzuki, Yokohama, Japan
[73] Assignee: Kabushiki Kaisha Toshiba, Kanagawa, Japan
[21] Appl. No.: 102,341
[22] Filed: Sep. 29, 1987
[30] Foreign Application Priority Data Sep. 29, 1986 [JP] Japan ................................. 61-230678

[51] Int. Cl.⁴ .......................... G11B 7/00; G11B 15/14
[52] U.S. Cl. .......................................... 369/59; 360/65
[58] Field of Search ...................... 369/59; 360/32, 65; 340/347 DA

[56] References Cited

U.S. PATENT DOCUMENTS

| | | | |
|---|---|---|---|
| 4,542,369 | 9/1985 | Kasuga | 340/347 |
| 4,580,128 | 4/1986 | Ogita et al. | 340/347 |
| 4,620,158 | 10/1986 | Yasukawa | 329/50 |
| 4,675,749 | 6/1987 | Banno et al. | 369/59 |

Primary Examiner—Vincent P. Canney
Attorney, Agent, or Firm—Finnegan, Henderson, Farabow, Garrett & Dunner

[57] ABSTRACT

An apparatus for reproducing digital record signals subjected to a predetermined frequency characteristic in a recording process and digital record signals not subjected to the frequency characteristic, the digital record signals including data for discrimination of the predetermined frequency characteristic. The apparatus includes an input terminal for receiving digital record signals, a circuit for detecting the predetermined frequency characteristic discrimination data, a digital processing circuit responsive to the detecting circuit for selectively giving the digital record signals applied from the input terminal a first prescribed frequency characteristic corresponding to the predetermined frequency characteristic in the recording or a second prescribed frequency characteristic, a digital-to-analog converter for converting the digital record signals applied from the digital processing circuit to analog signals and an amplifier for amplifying the analog signals applied from the digital-to-analog converter with a prescribed frequency characteristic capable of compensating for the predetermined frequency characteristic in the recording.

13 Claims, 4 Drawing Sheets

DIGITAL SIGNAL REPRODUCING CIRCUIT

FIELD OF THE INVENTION

The present invention relates generally to a digital record signal reproducing apparatus, and more particularly, to a de-emphasis control of a digital record signal reproducing apparatus.

BACKGROUND OF THE INVENTION

Generally, a digital record signal reproducing apparatus, for example, a digital record signal reproducing circuit of compact disc players has a circuit arrangement, as shown in FIG. 1.

Referring now to FIG. 1, an example of the conventional digital record signal reproducing circuit of compact disc players, will be briefly described. A digital record signal reproduced from a compact disc is applied to a digital-to-analog converter 10 through an input terminal 11. The digital-to-analog converter 10 converts the digital record signal to an analog signal by a conventional manner, as well known to persons skilled in the art. This analog signal is applied to an output amplifier 12 through a low pass filter 13. The low pass filter 13 removes high frequency components from the analog signal. The output amplifier 12 amplifies the analog signal to a prescribed level.

The output amplifier 12 is constructed by, e.g., an operational amplifier 14 and is provided with a feedback circuit 15. The analog signal passing through the low pass filter 13 is applied to the non-inverse input end (+) of the operational amplifier 14. The output of the operational amplifier 14 is fed back to the inverse input end (−) of the operational amplifier 14 through the feed-back circuit 15.

The feed-back circuit 15 is designed so that the feedback circuit 15 selectively gives the output of the output amplifier 12 a prescribed frequency characteristic. In more detail, the feed back circuit 15 has a first resistor 16 coupled between the output end and the inverse input end (−) of the operational amplifier 14, a second resistor 17 coupled between the inverse input end (−) of the operational amplifier 14 and a ground terminal 18, and a capacitive circuit 19 selectively coupled between the output end and the inverse input end (−) of the operational amplifier 14 in parallel with the first resistor 16. The capacitive circuit 19 is comprised of a capacitor 20, a third resistor 21 and a switch 22 which are connected in series with each other.

In the feed back circuit 15, the first and second resistors 16 and 17 determine the amplification degree of the output amplifier 12. The capacitive circuit 19 becomes effective in the feed back circuit 15 when the switch 22 turns ON. As a result, the output of the output amplifier 12 is given the prescribed frequency characteristics responsive to the capacitance of the capacitor 20, when the switch 22 turns ON. The switch 22 is automatically controlled its ON or OFF by a discrimination circuit 23 for discriminating an emphasis data, as will be described later.

In general, there are two kinds of compact discs in reference to a frequency characteristic of the digital record signal. As is well known to persons skilled in the art, a first kind of compact disc is given a predetermined pre-emphasis frequency characteristic to the digital record signal. The pre-emphasis processing is made to emphasize a higher frequency range of the record signal in a recording process. Compact discs with the predetermined pre-emphasis frequency characteristics are reproduced by predetermined de-emphasis processing to compensate the pre-emphasis frequency characteristics. As a result, the reproduced signal has reduced noise in the higher frequency range.

On the other hand, another kind of compact disc is not given such pre-emphasis processing in the recording process. Compact discs without such a pre-emphasis frequency characteristic are reproduced without any such a de-emphasis processing. That is, compact discs without such a pre-emphasis frequency characteristic are reproduced with processing having a flat frequency response characteristic.

Compact discs have a recording format in which a subcode data, a sort of control signal to be used in a reproducing process of compact discs, carries a prescribed bit for discriminating the pre-emphasis processing and the non pre-emphasis processing in recording process.

In digital record signal reproducing apparatus, as shown in FIG. 1, the apparatus detects the emphasis discrimination subcode data and applies to the emphasis data discrimination circuit 23 a control signal corresponding to the emphasis discrimination subcode data. The switch 22 turns ON or OFF according to the control signal. The switch 22 turns ON when a compact disc with the pre-emphasis processing is reproduced so that the capacitive circuit 19 becomes effective and gives the output of the output amplifier 12 with the de-emphasis frequency characteristic. The switch 22 turns OFF when a compact disc with non pre-emphasis processing is reproduced so that the capacitive circuit 19 is cut off from the feed back circuit 15. As a result, the output of the output amplifier 12 is given the flat frequency response characteristic.

FIG. 2 shows another example of the conventional digital record signal reproducing apparatus. In the circuit of the example, a digital filter 24 is provided prior to the digital-to-analog converter 10. The digital filter 24 reduces high harmonic signals which are close to the basic frequency of the analog output converted by a digital-to-analog converter 10. As a result, the high harmonic load on an analog low pass filter 13 is reduced. Other sections of the circuit are identical with that of FIG. 1.

In the conventional digital record signal reproducing apparatus, the feed back circuit 15 is automatically switched in response to the bit state of the pre-emphasis discrimination subcode data. When the record signal of compact discs with the pre-emphasis processing is reproduced, the feed back circuit 15 is subjected to the de-emphasis processing and the output amplifier 12 gives the output thereof with the de-emphasis frequency characteristics so that the record signal is compensated for the pre-emphasis frequency characteristics. When the record signals of compact discs with the non pre-emphasis processing are reproduced, the feed back circuit 15 is subjected to the flat frequency response characteristic processing and the output amplifier 12 gives the output thereof with the flat frequency response frequency characteristics.

The conventional digital record signal reproducing apparatus however has the following drawbacks. The output amplifier itself generates noises, e.g., thermal noise. The noise level varies when the switch 22 is turned ON or OFF. Further, the conventional digital record signal reproducing apparatus requires an analog switch such as the switch 22 to change the frequency characteristics of the output amplifier 12. The analog switch also generates a noise due to a contact resistance in its contact portions. For reducing the noise due to the contact resistance, a low resistance material is required for contact portions of the analog switch. However, such a material is very expensive.

SUMMARY OF THE INVENTION

Accordingly, it is an object of the present invention to provide a digital record signal reproducing apparatus in which a noise level does not vary in reproducing of digital record signals with either of a pre-emphasis processing and a non pre-emphasis processing.

Another object of the present invention is to provide a digital record signal reproducing apparatus which is able to cope with either of compact discs with a pre-emphasis processing or compact discs with a non pre-emphasis processing without changing the frequency response characteristics of an output amplifier.

A further object of the present invention is to provide a digital record signal reproducing apparatus which is able to cope with either of compact discs with the pre-emphasis processing or compact discs with non pre-emphasis processing without using an analog switch.

In order to achieve the above objects, an apparatus for reproducing digital record signals subjected to a predetermined frequency characteristic in a recording process and digital record signals not subjected to the frequency characteristic, includes an input terminal for receiving digital record signals, a circuit for detecting the predetermined frequency characteristic discrimination data, a digital processing circuit responsive to the detecting circuit for selectively giving the digital record signals received from the input terminal a first prescribed frequency characteristic corresponding to the predetermined frequency characteristic in the recording or a second prescribed frequency characteristic, a digital-to-analog converter for converting the digital record signals applied from the digital processing circuit to analog signals and an amplifier for amplifying the analog signals applied from the digital-to-analog converter with a prescribed frequency characteristic which is capable of compensating the predetermined frequency characteristic in the recording.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
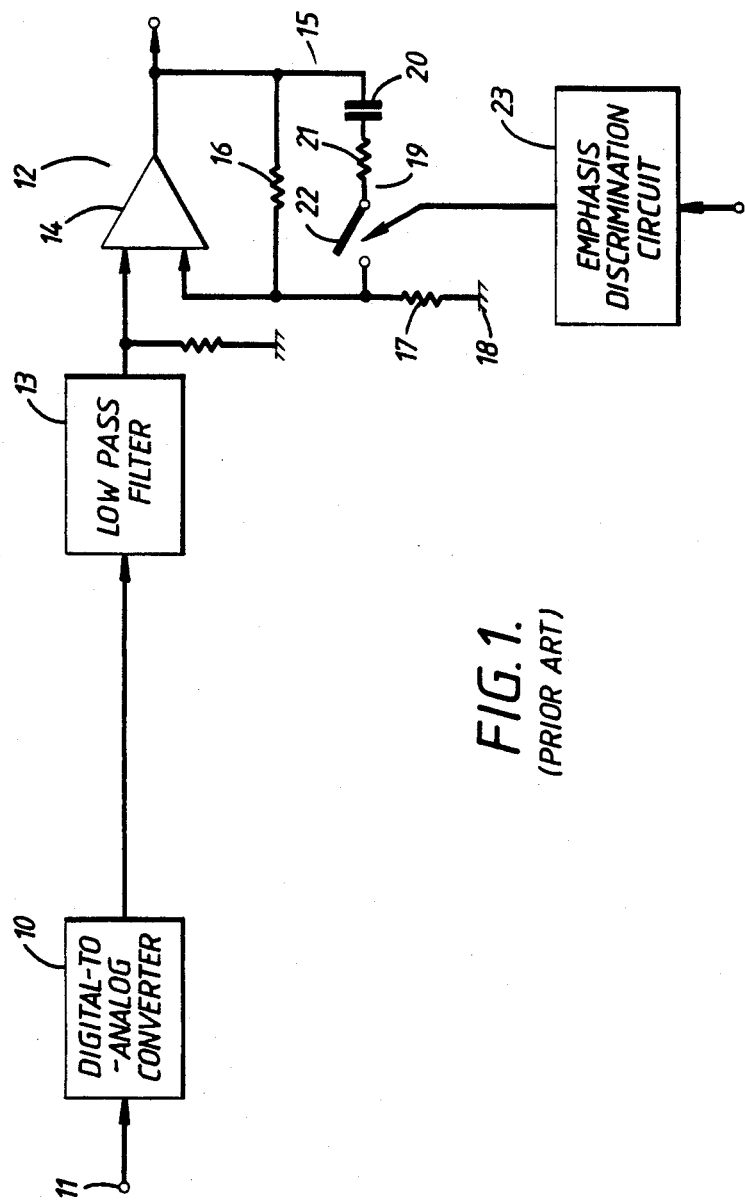
FIG. 1 is a block diagram showing an example of conventional digital record signal reproducing apparatus.
Figure 2:
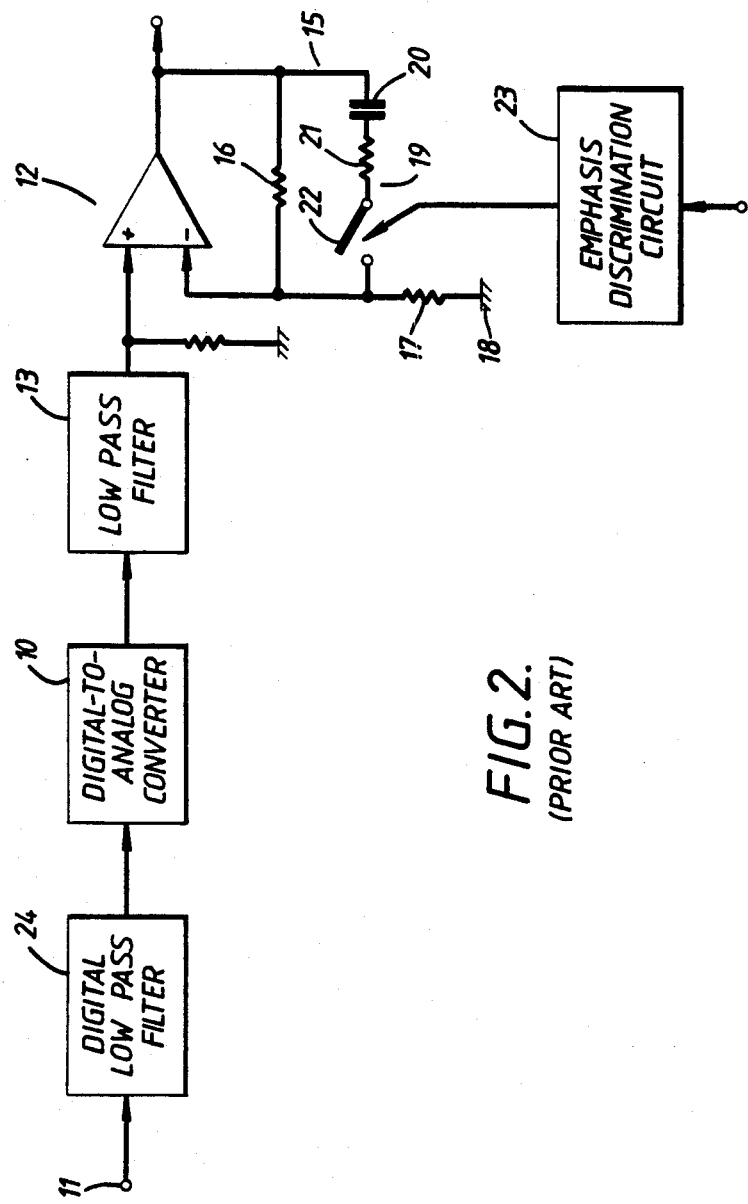
FIG. 2 is a block diagram showing another example of conventional digital record signal reproducing apparatus.
Figure 3:
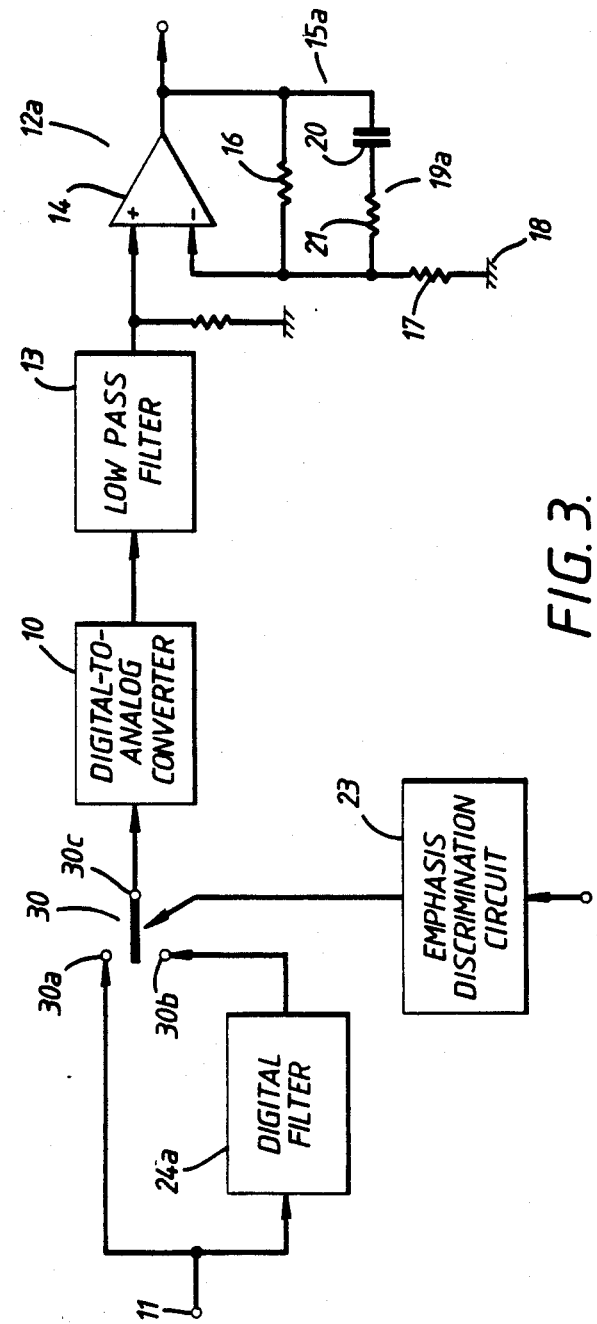
FIG. 3 is a block diagram showing an embodiment of digital record signal reproducing apparatus according to the present invention.

The present invention will now be described in detail with reference to the accompanying drawings. Throughout the drawings, like reference numerals and letters are used to designate elements like or equivalent to those used in FIGS. 1 and 2 (Prior Art) for the sake of simplicity of explanation Referring now to FIG. 3, an embodiment of the digital record signal reproducing apparatus according to the present invention will be described. FIG. 3 is a block diagram showing the embodiment.

In FIG. 3, a digital record signal reproduced from a compact disc is applied to an input terminal 11. The input terminal 11 is directly connected to a selectable terminal 30a of a selector 30. The input terminal 11 is further connected to another selectable terminal 30b of the selector 30 through a digital filter 24a.

The selective operation of selector 30 is automatically controlled by a discrimination circuit 23 for discriminating an emphasis data, as previously described. A common terminal 30c of the selector 30 is connected to a digital-to-analog converter 10. The digital-to-analog converter 10 converts the digital record signal passing through the selector 30 to an analog signal. The analog signal is applied to an output amplifier 12a through a low pass filter 13. The low pass filter 13 removes high frequency components from the analog signal. The output amplifier 12a amplifies the analog signal to a prescribed level.

The output amplifier 12a is constructed by, e.g., an operational amplifier 14 and is provided with a feed-back circuit 15a. The analog signal passing through the low pass filter 13 is applied to the non-inverse input end (+) of the operational amplifier 14. The output of the operational amplifier 14 is fed back to the inverse input end (−) of the operational amplifier 14 through the feed-back circuit 15a.

The feed-back circuit 15a is designed so that the feed-back circuit 15a gives the output of the output amplifier 12a a prescribed frequency characteristic. In more detail, the feed back circuit 15a has a first resistor 16 coupled between the output end and the inverse input end (−) of the operational amplifier 14, a second resistor 17 coupled between the inverse input end (−) of the operational amplifier 14 and a ground terminal 18, and a capacitive circuit 19a coupled between the output end and the inverse input end (−) of the operational amplifier 14 in parallel with the first resistor 16. The capacitive circuit 19a is comprised of a capacitor 20 and a third resistor 21 which are connected in series with each other.

In the feed back circuit 15a, the first and second resistors 16 and 17 determine the amplification degree of the output amplifier 12a. The capacitive circuit 19a gives the output of the output amplifier 12a with the prescribed frequency characteristics responsive to the capacitance of the capacitor 20. The capacitive circuit 19a is always connected in the feed back circuit 15a, in contrast to the capacitive circuit 19 of the conventional apparatus (see FIGS. 1 and 2).

In the embodiment of the digital record signal reproducing apparatus, as shown in FIG. 3, the apparatus detects an emphasis discrimination subcode data from a reproduced digital record signal and applies to the emphasis data discrimination circuit 23 a control signal corresponding to the emphasis discrimination subcode data. The selector 30 selects its connection to either of the first and second selective terminals 30a and 30b according to the control signal.

The selector 30 selects its connection to the first selective terminal 30a when a compact disc with the pre-emphasis processing is reproduced so that the digital record signal applied to the input terminal 11 is introduced to the digital-to-analog converter 10 as it is. The digital record signal is converted to an analog signal in the digital-to-analog converter 10 and then applied to the output amplifier 12a through the low pass filter 13. In the output amplifier 12a, the analog signal is given the prescribed de-emphasis processing by the feed back circuit 15a. As a result, the analog signal is compensated for the pre-emphasis frequency characteristics given in the recording process by the de-emphasis frequency characteristics of the feed back circuit 15a.

The selector 30 selects its connection to the second selective terminal 30b when a compact disc without pre-emphasis processing is reproduced so that the digital record signal applied to the input terminal 11 is introduced to the digital-to-analog converter 10 through the digital filter 24a.

The digital filter 24a is designed so that the filter 24a gives the digital record signal with a prescribed pre-emphasis frequency characteristics. In other words, the digital record signal not subjected to the pre-emphasis processing in the recording process is given the pre-emphasis frequency characteristics by the digital filter 24a. The digital record signal thus given the pre-emphasis frequency characteristics is applied to the digital-to-analog converter 10 and converted to an analog signal. The analog signal is processed by the low pass filter 13 and the output amplifier 12a in similar fashion to the analog signal corresponding to the digital record signal subjected to the pre-emphasis processing in the recording process.

In this latter case for the digital record signal passing through the digital filter 24a, the analog signal is compensated for the pre-emphasis frequency characteristics given in the digital filter 24a by the de-emphasis frequency characteristics of the feed back circuit 15a.

As a result, the output of the apparatus is provided with flat frequency response characteristics without any change of frequency characteristics in the output amplifier 12a, in either of the digital record signal with the pre-emphasis frequency characteristics or the non pre-emphasis frequency characteristics.

As described above, the emphasis discrimination circuit 23 controls the selector 30 in response to the emphasis discrimination subcode data detected from the reproduced digital record signal. The selector 30 is provided prior to the digital-to-analog converter 10. Therefore, the digital record signal applied to the selector 30 is isolated from noises due to contact resistances of switches or selectors.

Further, the output amplifier 12a always gives the analog signal with the same de-emphasis frequency characteristics, in spite of whether the analog signal is originated from the digital record signal with the pre-emphasis processing in recording or not. Therefore, the output of the output amplifier 12a is prevented from undergoing a level change.

Figure 4:
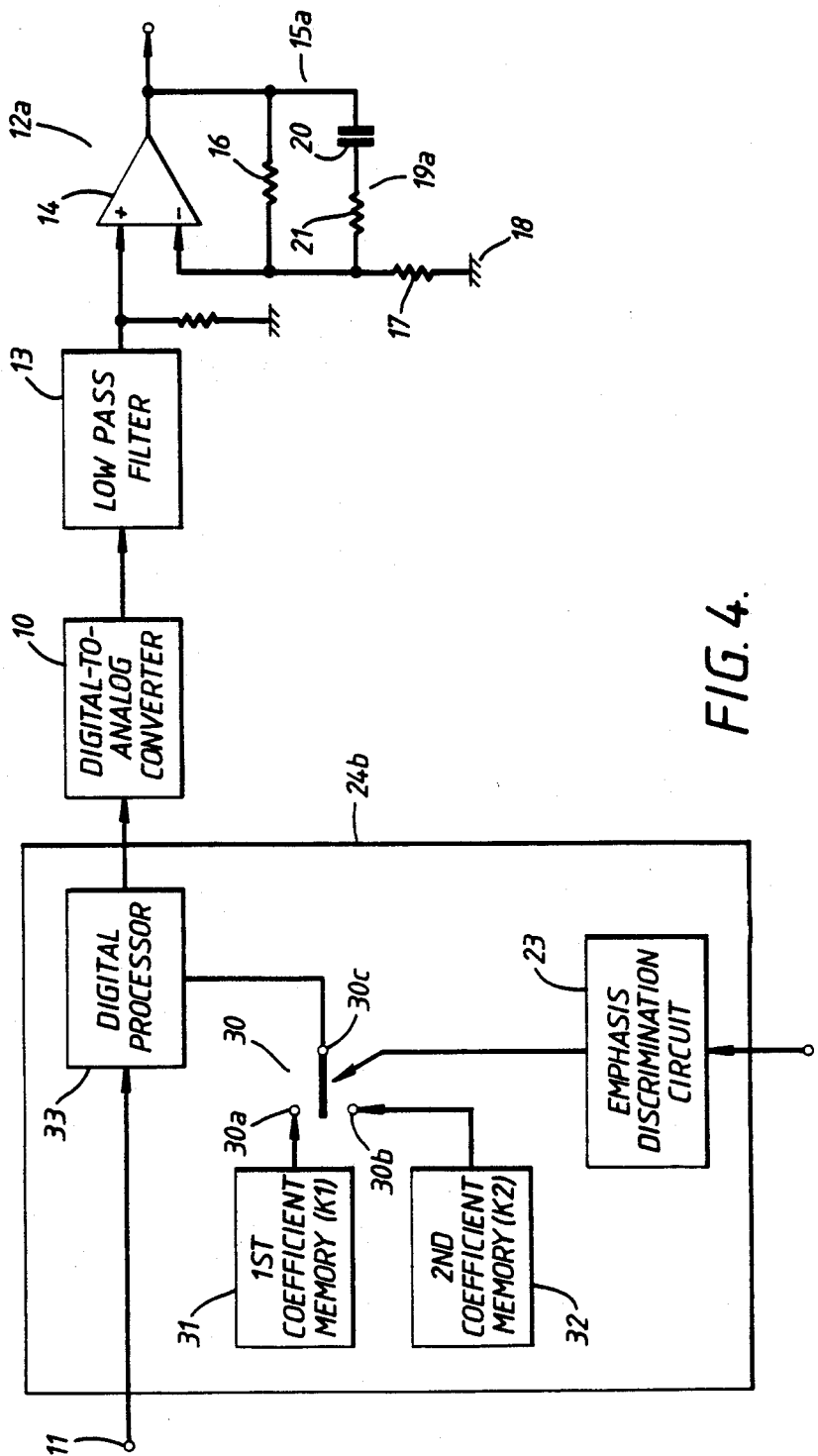
FIG. 4 is a block diagram showing another embodiment of digital record signal reproducing apparatus according to the present invention.

Referring now to FIG. 4, another embodiment of the digital record signal reproducing apparatus according to the present invention will be described. FIG. 4 is a block diagram showing the embodiment.

In FIG. 4, a digital record signal reproduced from a compact disc is applied to an input terminal 11. The input terminal 11 is applied to a digital-to-analog converter 10 through a selectively operable digital filter 24b, as described later.

The digital filter 24b is comprised of first and second coefficient memories 31 and 32, a selector 30 and a digital processor 33. The first and second coefficient memories 31 and 32 are constructed from a ROM (Read Only Memory), respectively, and connnected to first and second selectable terminals 30a and 30b of selector 30. The selector 30 is automatically controlled in its selective operation by a discrimination circuit 23 for discriminating an emphasis data, as previously described. A common terminal 30c of the selector 30 is connected to the digital processor 33. The digital processor 33 selectively gives the digital record signal with prescribed first and second frequency characteristics, as will be described later.

The digital record signal passing through the digital processor 33 is applied to digital-to-analog converter 10. The digital-to-analog converter 10 converts the digital record signal to an analog signal. The analog signal is applied to an output amplifier 12a through a low pass filter 13. The low pass filter 13 removes high frequency components from the analog signal. The output amplifier 12a amplifies the analog signal to a prescribed level. The digital record signal passing through the digital processor 33 and the analog signal are processed in the digital-to-analog converter 10, the low pass filter 13 and the output amplifier 12a in the same manner as in the first embodiment.

In the second embodiment of the digital record signal reproducing apparatus, as shown in FIG. 4, the digital record signal applied to the input terminal 11 is introduced to the digital processor 33 in the digital filter 24b. The apparatus detects the emphasis discrimination subcode data from the reproduced digital record signal and applies to the emphasis data discrimination circuit 23 a control signal corresponding to the emphasis discrimination subcode data.

The selector 30 selects its connection to the first selectable terminal 30a or the second selectable terminal 30b in response to the control signal applied from the emphasis discrimination circuit 23. As a result, the first and second coefficient memories 31 and 32 are selectively connected to the digital processor 33.

The first coefficient memory 31 has a coefficient K 1 which corresponds to a prescribed low pass filter characteristic. The second coefficient memory 32 has another coefficient K 2 which corresponds to both the prescribed low pass filter characteristic and a prescribed pre-emphasis frequency characteristic.

When a compact disc with the pre-emphasis processing is reproduced, the first coefficient memory 31 is connected to the digital processor 33. Then, the coefficient K 1 stored in the first coefficient memory 31 is read into the digital processor 33 so that the selectively operable digital filter 24b operates only as a digital low pass filter. As a result, the digital record signal subjected to the pre-emphasis processing in the recording process passes through the selectively operable digital filter 24b with the result that high frequency components are removed. The digital record signal is introduced to the digital-to-analog converter 10. The digital record signal is converted to an analog signal in the digital-to-analog converter 10 and then applied to the output amplifier 12a through the low pass filter 13. In the output amplifier 12a, the analog signal is given the prescribed de-emphasis processing by the feed back circuit 15a. As a result, the analog signal is compensated for the pre-emphasis frequency characteristics given in the recording process by the de-emphasis frequency characteristics of the feed back circuit 15a.

When a compact disc not subjected to the pre-emphasis processing in the recording process is reproduced, the second coefficient memory 32 is connected to the digital processor 33. Then, the coefficient K 2 stored in the second coefficient memory 32 is read into the digital processor 33 so that the selectively operable digital filter 24b operates as both the digital low pass filter and a pre-emphasis processing circuit. As a result, the digital record signal not subjected to the pre-emphasis processing in the recording process is given the preemphasis frequency characteristics by the selectively operable digital filter 24b. The digital record signal thus given the pre-emphasis frequency characteristics is applied to the digital-to-analog converter 10 and converted to an analog signal. The analog signal is processed by the low pass filter 13 and the output amplifier 12a in similar fashion to the analog signal corresponding to the digital record signal subjected to the pre-emphasis processing in the recording process.

In this latter case for the digital record signal given the pre-emphasis processing by the selectively operable digital filter 24b, the analog signal is compensated for the pre-emphasis frequency characteristics given in the digital filter 24a by the de-emphasis frequency characteristics of the feed back circuit 15a.

As a result, the output of the apparatus is provided with flat frequency response characteristics without any change of frequency characteristics in the output amplifier 12a, in either of the digital record signal subjected to the pre-emphasis processing or not subjected to the pre-emphasis processing in the recording process.

As described above, the emphasis discrimination circuit 23 controls the selector 30 in response to the emphasis discrimination subcode data detected from the reproduced digital record signal. The selector 30 is provided in the selectively operable digital filter 24b for selecting the first and second coefficient memories 31 and 32. Therefore, the digital record signal applied to the digital processor 33 is isolated from noises due to contact resistances of switches or selectors.

Further, the output amplifier 12a always gives the analog signal with the same de-emphasis frequency characteristics, in spite of whether the analog signal is originated from the digital record signal with the pre-emphasis processing in recording or not. Therefore, the output of the output amplifier 12a is prevented from effecting a level change.

As described above, the present invention can provide an extremely preferable digital record signal reproducing apparatus. Further in accordance with the present invention, it is not necessary to provide an analog type switch, so that the present invention does not incur the above noted increase of costs to carry out. Additionally, the present invention does not cause degradation of sound quality accompanying a conventional digital record signal reproducing apparatus.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. Apparatus for reproducing digital record signals subjected to a predetermined frequency characteristic in a recording process and digital record signals not subjected to the frequency characteristic, the digital record signals including data for discrimination of the predetermined frequency characteristic, comprising:
   input means for receiving digital record signals;
   means for detecting the predetermined frequency characteristic discrimination data;
   digital means responsive to the detecting means for selectively giving the digital record signals received from the input means a first prescribed frequency characteristic including the predetermined frequency characteristic or a second prescribed frequency characteristic without including the predetermined frequency characteristic respectively according to whether the predetermined frequency characteristic data is not or is detected;
   digital-to-analog conversion means for converting the digital record signals received from the digital means to analog signals; and
   means for amplifying the analog signals received from the digital-to-analog conversion means with a prescribed frequency characteristic that is capable of compensating for the predetermined frequency characteristic.

2. The apparatus of claim 1 wherein the digital means gives the digital record signals a prescribed pre-emphasis frequency characteristic corresponding to an equivalent pre-emphasis frequency characteristic in the recording process as said first prescribed frequency characteristic and to amplifying means amplifies the analog signals with a prescribed de-emphasis frequency characteristic which is capable of compensating the pre-emphasis frequency characteristic.

3. The apparatus of claim 2 wherein the digital means operates in response to an emphasis discrimination data corresponding to the equivalent pre-emphasis frequency characteristic in the recording process.

4. The apparatus of claim 3 wherein the emphasis discrimination data indicates whether the digital record signals are subjected to the pre-emphasis frequency characteristic in the recording process or not subjected to the pre-emphasis frequency characteristic.

5. The apparatus of claim 4 wherein the digital means includes digital filter means having the pre-emphasis frequency characteristic.

6. The apparatus of claim 2 wherein the amplifying means includes a feed back circuit means with the de-emphasis frequency characteristics.

7. The apparatus of claim 6 wherein the analog signals are applied to the amplifying means through a low pass filter.

8. Apparatus for reproducing digital record signals subjected to a predetermined frequency characteristic in a recording process and digital record signals not subjected to the frequency characteristic, the digital record signals including data for discrimination of the predeterined frequency characteristic, comprising:

input means for receiving digital record signals;

means for detecting the predetermined frequency characteristic discrimination data in the digital record signals;

digital means, responsive to the detecting means and coupled to receive the digital record signals from the input means, for selectively giving the digital record signals the predetermined frequency characteristic upon said detecting means detecting that the predetermined frequency characteristic is absent from the digital record signals;

digital-to-analog conversion means for converting the digital record signals received from the digital means to analog signals; and means for amplifying the analog signals received from the digital-to-analog conversion means with a prescribed frequency characteristic that compensates for the predetermined frequency characteristic.

9. The apparatus of claim 8 wherein the digital means selectively gives the digital record signals a prescribed pre-emphasis frequency characteristic corresponding to an equivalent pre-emphasis frequency characteristic in the recording as said predetermined frequency characteristic and the amplifying means amplifies the analog signals with a prescribed de-emphasis frequency characteristic that is capable of compensating the pre-emphasis frequency characteristic.

10. The apparatus of claim 9 wherein the digital means operates in response to an emphasis discrimination data corresponding to the equivalent pre-emphasis frequency characteristic of the recording process.

11. The apparatus of claim 10 wherein the emphasis discrimination data indicates whether the digital record signals are subjected to the pre-emphasis frequency characteristic in the recording process or not subjected to the pre-emphasis frequency characteristic.

12. The apparatus of claim 9 wherein the amplifying means includes a feed back circuit means with the de-emphasis frequency characteristic.

13. The apparatus of claim 12 wherein the analog signals are applied to the amplifying means through a low pass filter.

* * * * *